United States Patent [19] [11] Patent Number: 6,100,471
Fouache [45] Date of Patent: Aug. 8, 2000

[54] COMBINED DISTRIBUTION APPARATUS FOR LOW CURRENT MEASURING CABLES AND HIGH-VOLTAGE IGNITION CABLES IN INTERNAL COMBUSTION ENGINES

[75] Inventor: Pascal Fouache, Marseilles, France

[73] Assignee: Controle Mesure Regulation—CMR S.A., Marseilles, France

[21] Appl. No.: 09/014,425

[22] Filed: Jan. 27, 1998

Related U.S. Application Data

[63] Continuation of application No. 08/211,242, filed as application No. PCT/FR92/00931, Oct. 7, 1992, abandoned.

[30] Foreign Application Priority Data

Oct. 8, 1991 [FR] France ................................ 91 12644
May 27, 1992 [FR] France ................................ 92 06749

[51] Int. Cl.⁷ .................................................. H01B 3/00
[52] U.S. Cl. ...................... 174/72 C; 174/72 R; 174/95; 174/97; 123/169 PA; 439/624
[58] Field of Search ................. 174/70 R, 71 R, 174/72 R, 72 A, 72 C, 95, 97, 68.1, 68.3, 99 R; 439/623, 624; D13/155; 123/169 P, 169 PA

[56] References Cited

U.S. PATENT DOCUMENTS

| | | | |
|---|---|---|---|
| 958,835 | 3/1910 | Schmidt | 123/143 R |
| 1,330,811 | 2/1920 | Konigslow et al. | 174/72 A |
| 1,424,056 | 7/1922 | Windblad | 123/143 C |
| 1,979,804 | 11/1934 | Lutz | 285/152.1 |
| 2,136,583 | 11/1938 | Corbett | 174/72 C |
| 3,697,767 | 10/1972 | Fioravanti | 307/10.1 |
| 3,790,695 | 2/1974 | Floessel et al. | 174/28 |
| 4,097,096 | 6/1978 | Kochendorfer | 312/406 |
| 4,347,998 | 9/1982 | Loree | 248/68.1 |
| 4,620,061 | 10/1986 | Appleton | 174/51 |
| 4,785,376 | 11/1988 | Dively | 361/622 |
| 4,888,452 | 12/1989 | Krehl et al. | 174/101 |
| 4,891,012 | 1/1990 | Pajot | 439/34 |
| 5,024,614 | 6/1991 | Dola et al. . | |
| 5,399,812 | 3/1995 | Woszczyna et al. | 174/97 |

FOREIGN PATENT DOCUMENTS

| | | |
|---|---|---|
| 0231428 | 8/1987 | European Pat. Off. . |
| 0235924 | 9/1987 | European Pat. Off. . |
| 0284488 | 9/1988 | European Pat. Off. . |
| 0418882 | 3/1991 | European Pat. Off. . |
| 2078336 | 11/1971 | France . |
| 2174810 | 10/1973 | France . |
| 2592994 | 7/1987 | France . |
| 2639297 | 5/1990 | France . |
| 3337596 | 4/1985 | Germany . |
| 3435566 | 4/1987 | Germany . |
| 3535382 | 4/1987 | Germany . |
| 3535383 | 4/1987 | Germany . |
| 3435566 | 11/1989 | Germany . |
| 1287074 | 8/1972 | United Kingdom . |

*Primary Examiner*—Dean A. Reichard
*Assistant Examiner*—Dhiru R Patel
*Attorney, Agent, or Firm*—Greenblum & Bernstein, P.L.C.

[57] ABSTRACT

Combined distribution duct for low current measuring cables and for high voltage ignition cables in internal combustion engines. This device combines a wiring duct having one connector per sensor for each cylinder, and one or more outlets supplying the corresponding ignition coil and any other control. The duct is composed of a steel tube clamped to the engine or divided into two mutually engageably portions having internal grooves for receiving a screening plate, electronic adapter boards, or cable attaching accessories. The two portions may be separated by an internal grooved profiled section. The device is suitable for all kinds of internal combustion engines, but particularly high-powered engines, especially stationary and marine engines.

20 Claims, 3 Drawing Sheets

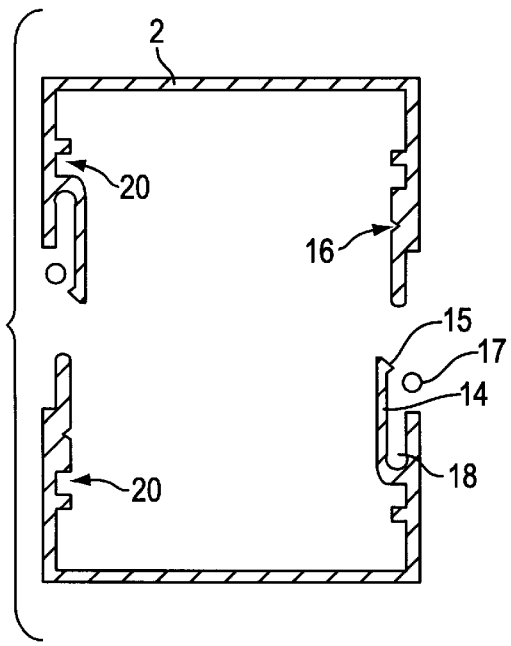
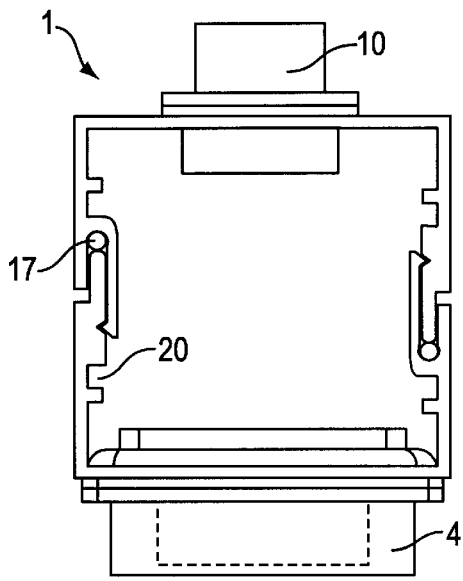
FIG. 4    FIG. 5
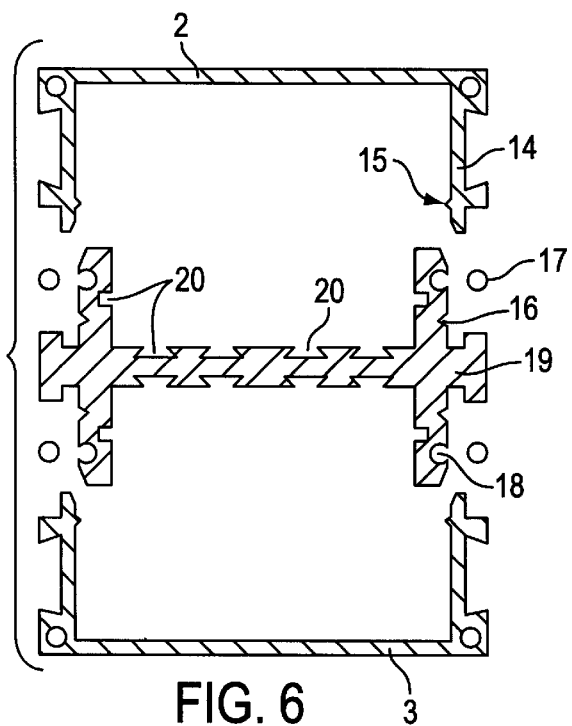
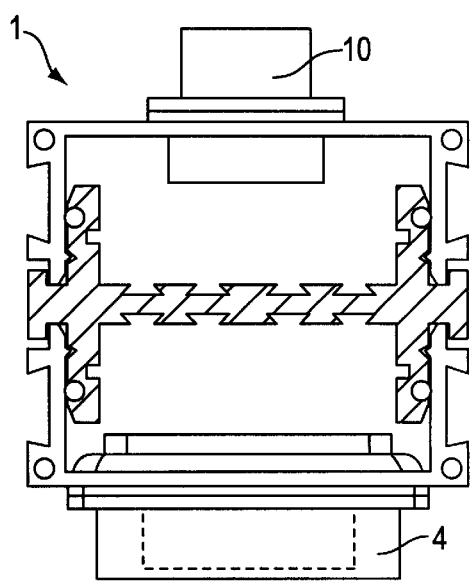
FIG. 6    FIG. 7

COMBINED DISTRIBUTION APPARATUS FOR LOW CURRENT MEASURING CABLES AND HIGH-VOLTAGE IGNITION CABLES IN INTERNAL COMBUSTION ENGINES

CROSS-REFERENCE TO RELATED APPLICATIONS

This application is a continuation of application Ser. No. 08/211,242, filed Oct. 7, 1992 is now abandoned, which is a U.S. National Stage of International application No. PCT/FR92/00931, filed Oct. 7, 1992. The entire disclosure of application Ser. No. 08/211,242 is considered as being part of the disclosure of this application, and the entire disclosure of application Ser. No. 08/211,242 is expressly incorporated by reference herein in its entirety.

BACKGROUND OF THE INVENTION

1. Field of the Invention

The object of the present invention is a combined distribution duct for low current measuring cables and high-voltage ignition cables in internal combustion engines.

It is suitable for all types of internal combustion engines but is particularly intended for high-voltage power engines and especially stationary and marine engines.

2. Discussion of the Background Information

With the object of enabling the improvement of their efficiency and performance, modern internal combustion engines have increasingly resorted to temperature sensors or other parameters, which entails the addition of supplementary cable harnesses such as ignition cables or others, to the regular networks. One then comes up against the inconvenience of assemblies requiring cable hooking elements for the pyrometric linkage and ignition distribution to the engine, and defective contacts due to the interposition of line junction boxes. To that is added the difficulty originating from the replacement of sensors or coils as well as the space requirement and aesthetic deficiency of these installations.

FR 72 09 565, which was issued as French Patent No. 2,174,810, by the same inventor, describes a rigid duct intended for pyrometric cables for temperature sensors of Diesel engine exhaust, but this only partially resolves the problem.

DE-A-3 435 566 presents a wiring duct for vehicles, formed of a body comprising connector bases and a cable outlet at the level of each cylinder, the body being closed by a cover. This arrangement imposes locating all the connectors and outlets on the same side of the duct, which limits the flexibility of use. In addition, there is no possibility provided for separating the various types of cables inside the duct.

SUMMARY OF THE INVENTION

The device according to the present invention overcomes all these disadvantages and enables the measurement of temperatures and the distribution of the engine ignition to be ensured by reducing the space requirement of the cable harnesses and deterioration risks, while simplifying the installation and facilitating disassembly and reassembly, as well as the interchangability of the sensors or the ignition coils which can be replaced without any difficulty. In addition, the thus stabilized assembly withstands vibrations, exhibits considerable sturdiness, avoids disturbance to the measurements and is perfectly integrated into the support.

This device is constituted by the combination of a wiring duct comprising one connector per sensor at the level of each cylinder, as well as at least one outlet supplying the corresponding ignition coil and possible controls, the duct being composed of a steel tube clamped to the engine or divided into two nestable portions comprising internal grooves intended to receive a screening plate, electronic adaptor boards, or cable attaching accessories, both portions capable of being separated by a grooved internal section and being designed to enable wiring with the open duct, the portions only being assembled and fixed to the engine once this operation is completed.

The present invention is directed to an electrical distribution conduit for low voltage measurement cables and high voltage ignition cables in a high powered combustion engine. The conduit includes a cable conduit having at least a connector base and a cable outlet associated with each cylinder, one of a screening plate, a central section and a longitudinal central partition positioned within the cable conduit to separate the measurement cables from the high voltage ignition cables, and the base connector adapted to receive various sensors and the cable outlet adapted to supply a respective ignition coil.

In accordance with another feature of the present invention, the cable conduit may include two interlocking sections formed to enable open conduit cabling and an internal groove adapted to receive one of the one of the screening plate, the central section, and the longitudinal central partition, electronic adaptor boards, and cable fixing accessories. The sections are assembled and fixed on the motor after completion of the cabling.

In accordance with another feature of the present invention, the cable conduit may include a central section having at least one of at least one section and internal grooves. Further, the at least one section and the central section may be composed of a light alloy material to reduce the weight of the system and to enable better handling.

In accordance with still another feature of the present invention, the cable conduit may include electronic boards having components for signal processing and networking to provide local or remote information.

In accordance with a further feature of the present invention, the at least one section may include two sections having overlapping portions and the two sections may be coupled together to form a seal between the overlapping portions. Further, the sections may be coupled together with rivets. Alternatively, the two sections may be clipped together, the two sections may have a thinner part with a rib in relief corresponding to a groove and immobilizing the two parts, and the conduit may include a cylindrical seal enclosed in a suitable housing.

In accordance with a still further feature of the present invention, the conduit may be composed of a steel tube having a longitudinal central partition for separating the measurement and ignition cables. Further, the longitudinal central partition may act as an insulator. Still further, the longitudinal central partition may be composed of metal and secured using an insulating support forming a slide.

In accordance with another feature of the present invention, the conduit may include expanded polyurethane within the cable conduit such that, after connecting the low voltage cables from the plug receptacles to the main measurement cable plug, and after connecting the ignition cables from the outgoing cables to the main ignition plug, the cable conduit is filled with the expanded polyurethane to insulate the cables and protect them against vibrations.

In accordance with a still further feature of the present invention, the cable conduit may include outgoing cables coupled, through plugable multi-contact connectors, to measurement and ignition cables within the cable conduit to continuity to respective measurement and ignition equipment.

The present invention is also directed to a distribution duct mountable to an internal combustion engine. The distribution duct includes at least one low current measuring cable, at least one high voltage ignition cable, a wiring duct including at least one connector base having an internal and an external portion and at least one cable outlet connector including an internal and an external portion, and a member adapted to separate the low current measuring cable from the high voltage ignition cable. The internal portion of the at least one connector base may be coupled the said at least one low current measuring cable and the internal portion of the at least one cable outlet connector may be coupled to the high voltage ignition cable.

In accordance with another feature of the present invention, the member may be composed of one of a screening plate, an internal separation member, and a longitudinal central portion.

In accordance with another feature of the present invention, the member may be composed of a material to electrically separate the low current measuring wire from the high voltage ignition cable.

In accordance with still another feature of the present invention, the external portion of the at least one connector base may be adapted to receive a sensor.

In accordance with a further feature of the present invention, the external portion of the at least one cable outlet connector may be adapted to receive an ignition coil.

In accordance with a still further feature of the present invention, the cable duct may be composed of at least two nestable sections.

In accordance with yet another feature of the present invention, the cable duct may include internal grooves adapted to receive the member.

BRIEF DESCRIPTION OF THE DRAWINGS

In the annexed schematic drawings, provided as a non-limiting example of one of the embodiments of the object of the invention:

FIGS. 4 and 5 represent, under the same conditions, a duct having a ratchet closing mechanism;

FIGS. 6 an 7 represent, still under the same conditions, a duct comprising an internal separation.

DETAILED DESCRIPTION OF THE INVENTION

Figure 1:
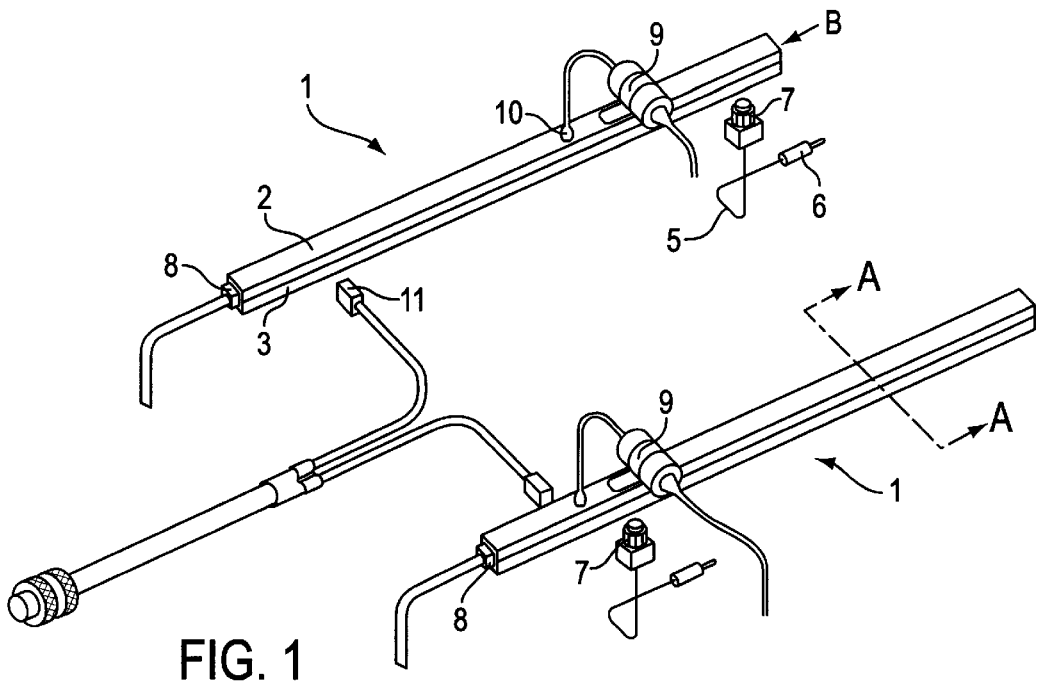
FIG. 1 axonometrically represents an assembly using two distribution ducts according to the invention.
Figure 2:
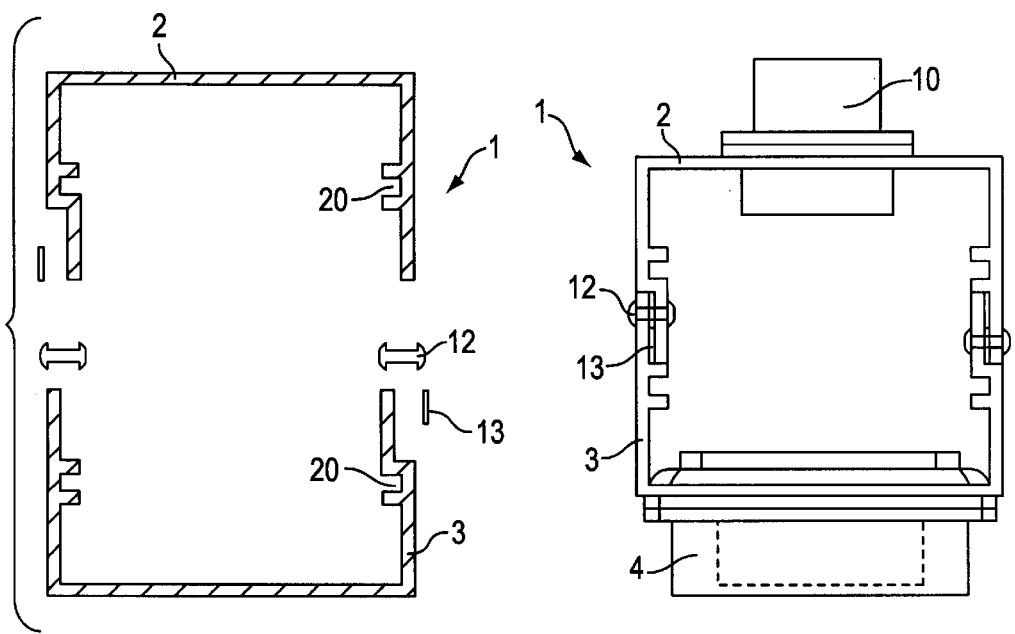
FIG. 2 is an enlarged transverse section along arrows A—A of FIG. 1, showing the two separate portions of a wiring duct whose closure is insured by riveting or the equivalent.
Figure 3:
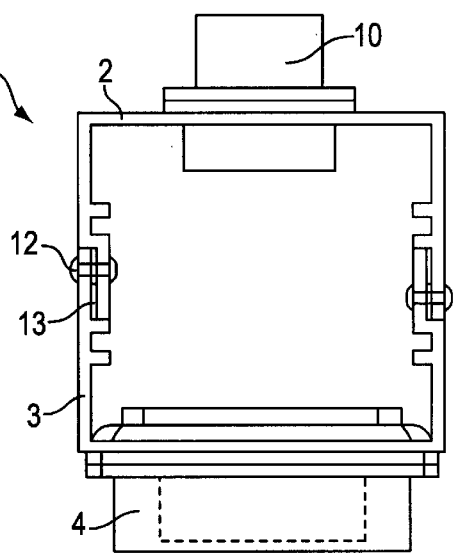
FIG. 3 is an enlarged end view along arrow B of FIG. 1, of the same duct showing the arrangement of the sensor connectors and the outlets for the ignition coil, or control.

The device, FIGS. 1 to 7, is composed of two U-sections 2,3, preferably obtained in a light alloy and which, once assembled, compose a wiring duct 1 having the shape of a square- or rectangular-shaped tube screening the electrical cables abutting on the cylinders or at any other portion of a thermic engine with internal combustion.

At the level of each cylinder, the wiring duct 1 can be equipped with a connector base 4 on which the linkage cable 5 of a corresponding sensor 6 is connected by virtue of a connector 7.

The sensors 6 are most often temperature sensors. In this case, they are simplified and lightened to withstand vibrations, whereas the absence of an electrical connection head prevents any loosening of the connections. They are constituted by a stainless steel tube having a straight or curved outlet, whose end can be necked to reduce the thermic inertia during the measurement. A non-adjustable stop device demarcates the penetration in the exhaust collar or in the combustion chamber for each type of engine. The linkage cable, protected under a metallic braid, extends the thermocouple constantan-nickel-alloy and ensures the linkage up to the duct 1 by the connector 7. The conductors are of an appropriate quality as a function of the thermocouple. A linkage cable insures the continuity of the pyrometric circuits from the duct 1 to the measuring apparatus. It is formed by several copper conductors and at least one common or separate compensation conductors in order to displace the cold junction, and is protected mechanically by a metallic braid and equipped with connectors that can be plugged at one or both ends.

Each connector base 4 is connected from the inside of the wiring duct 1 to a multi-contact general measuring connector 8 preferably fixed to an end thereof, either directly or by means of an electronic signal processing box.

Similarly, at the level of each ignition coil 9, the duct 1 is equipped with an outlet 10 to which the corresponding coil or control element is connected. Each outlet is connected from the inside of the duct to a multi-contact general ignition or control connector 11 fixed to the duct.

The assembly of both sections 2,3 can be done by means of rivets 12, a sealing joint 13 being interposed between the overlapping portions.

This assembly can also be obtained by locking of the sections 2 and 3, the latter being provided with a thin portion 14 bearing a rib 15 in relief corresponding to a groove 16 and ensuring the immobilization of both portions, a cylindrical joint 17 imprisoned in an adequate housing 18 ensuring the impermeability.

One can envision a wiring duct 1 with a central section 19, also in a light alloy, capable of being equipped with one or two sections 2,3 depending upon the requirements (integration or not of the ignition circuits), the assembly of the section or sections with the central section being undertaken in the same way as for the single sections.

The sections 2,3, as well as the possible central section 19, are provided with internal grooves 20 intended to receive a screening plate, cable attaching accessories or electronic adaptor boards, the latter capable of comprising signal processing components enabling a networking of these boards by providing a local or off-set "intelligence".

The cables 25,26 will be able to be hooped in the duct 1 or maintained in position by anti-vibratory foam bands or any method insuring a wiring maintenance.

The connecting of the general outlets is obtained by plugable multi-contact connectors mounted to the mechanically protected multi-conducting linkage cables and ensuring the continuity of the linkages up to the measurement and ignition apparatus.

Figure 8:
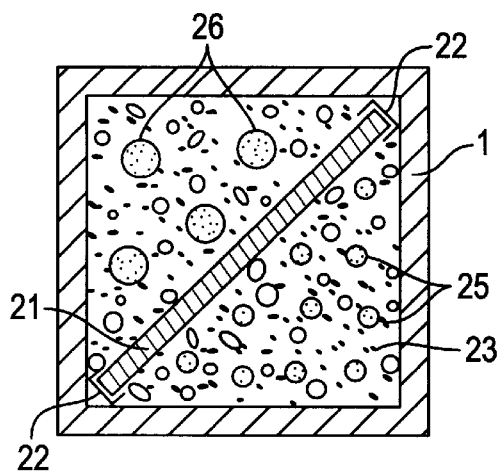
FIGS. 8 and 9 are transverse sections along arrows A—A of FIG. 1, showing two embodiment variations of the duct, composed of a steel tube comprising a central partition.
Figure 9:
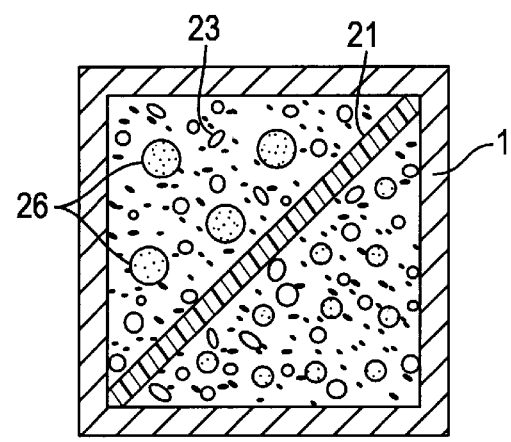

In an implementation variation, the device is constituted of a square-shaped steel tube 1 having a longitudinal central partition 21 ensuring the separation of the measuring circuits from those relating to the ignition. This partition can be insulating (FIG. 9) or metallic and fixed, by virtue of insulating supports 22 forming a slide (FIG. 8). In this latter case, the central partition 21 is connected to the mass at one of its ends.

After passage of the low current cables 25, connecting the connector bases to the main measuring connector 8, as well as the ignition cables 26 connecting the outlets 10 to the main ignition connector 11, the duct 1 is filled, at the end of manufacturing, with expanded polyurethane 23 ensuring the insulation and protection against vibration of these cables.

The positioning of various component elements provides the object of the invention with a maximum of necessary effects which, to date, have not been obtained by similar devices.

What is claimed:

1. An electrical distribution apparatus for a high powered combustion engine comprising:

low voltage measurement cables;

high voltage ignition cables;

a cable conduit having at least one connector base and a cable outlet associated with each cylinder of the high powered combustion engine;

one of a screening plate, a central section, and a longitudinal central partition positioned within the cable conduit to separate the measurement cables from the high voltage ignition cables; and the at least one connector base adapted to receive various sensors and the cable outlet adapted to be coupled to a respective ignition coil of the high powered combustion engine.

2. The apparatus in accordance with claim 1, the cable conduit comprising:

two interlocking sections formed to enable open conduit cabling; and an internal groove adapted to receive one of the one of the screening plate, the central section, and the longitudinal central partition, electronic adaptor boards, and cable fixing accessories, wherein the sections are assembled and fixed on the high powered combustion engine after cabling connections are completed.

3. The apparatus in accordance with claim 1, the cable conduit comprising a central section having at least one of at least one section and internal grooves.

4. The apparatus in accordance with claim 3, the at least one section and the central section being composed of a light alloy material to reduce the weight of the system and to enable better handling.

5. The apparatus in accordance with claim 1, the cable conduit comprising electronic boards having components for signal processing and networking to provide local or remote information.

6. The apparatus in accordance with claim 3, the at least one section comprising two sections having overlapping portions; and the two sections are coupled together to form a seal between the overlapping portions.

7. The apparatus in accordance with claim 6, the two sections being coupled together with rivets.

8. The apparatus in accordance with claim 6, the two sections being clipped together;

the two sections having a thinner part with a rib in relief corresponding to a groove and immobilizing the two parts; and the conduit further comprising a cylindrical seal enclosed in a suitable housing.

9. The apparatus in accordance with claim 1, the conduit being composed of a steel tube having a longitudinal central partition for separating the measurement and ignition cables.

10. The apparatus in accordance with claim 9, the longitudinal central partition acting as an insulator.

11. The apparatus in accordance with claim 9, the longitudinal central partition being composed of metal and secured using an insulating support forming a slide; and the longitudinal central partition having one end being coupled to ground.

12. The apparatus in accordance with claim 1, further comprising expanded polyurethane within the cable conduit, wherein after connecting the low voltage cables from the connector bases to the main measurement cable plug, and after connecting the ignition cables from the outgoing cables to the main ignition plug, the cable conduit is filled with the expanded polyurethane to insulate the cables and protect them against vibrations.

13. The apparatus in accordance with claim 1, further comprising outgoing cables coupled, through removable multi-contact connectors, to the measurement and ignition cables within the cable conduit to provide continuity to respective measurement and ignition equipment.

14. A distribution duct mountable to an internal combustion engine comprising:

at least one low current measuring cable;

at least one high voltage ignition cable;

a wiring duct comprising at least one connector base having an internal and an external portion, said internal portion of the at least one connector base being coupled to said at least one low current measuring cable, and at least one cable outlet connector including an internal and an external portion, said internal portion of the at least one cable outlet connector being coupled to said high voltage ignition cable; and a member adapted to separate the low current measuring cable from the high voltage ignition cable.

15. The distribution duct in accordance with claim 14, said member being composed of one of a screening plate, an internal separation member, and a longitudinal central portion.

16. The distribution duct in accordance with claim 14, said member being composed of a material to electrically separate the low current measuring wire from the high voltage ignition cable.

17. The distribution duct in accordance with claim 14, said external portion of said at least one connector base being adapted to receive a sensor.

18. The distribution duct in accordance with claim 14, said external portion of said at least one cable outlet connector being adapted for coupling to an ignition coil.

19. The distribution duct in accordance with claim 14, said cable duct being composed of at least two nestable sections.

20. The distribution duct in accordance with claim 14, said cable duct comprising internal grooves adapted to receive the member.

* * * * *